(12) United States Patent
Yoshimura et al.

(10) Patent No.: US 8,284,472 B2
(45) Date of Patent: Oct. 9, 2012

(54) ALL-SOLID-STATE REFLECTIVE DIMMING ELECTROCHROMIC DEVICE HAVING BUFFER LAYER AND DIMMER MEMBER USING THE SAME

(75) Inventors: Kazuki Yoshimura, Aichi (JP); Yasusel Yamada, Aichi (JP); Kazuki Tajima, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 312 days.

(21) Appl. No.: 12/665,069

(22) PCT Filed: Jun. 17, 2008

(86) PCT No.: PCT/JP2008/061037
§ 371 (c)(1),
(2), (4) Date: Dec. 17, 2009

(87) PCT Pub. No.: WO2008/156077
PCT Pub. Date: Dec. 24, 2008

(65) Prior Publication Data
US 2010/0188726 A1    Jul. 29, 2010

(30) Foreign Application Priority Data

Jun. 18, 2007   (JP) ................................. 2007-159999
Oct. 26, 2007   (JP) ................................. 2007-279709

(51) Int. Cl.
*G02F 1/153*      (2006.01)
(52) U.S. Cl. ........ 359/270; 359/267; 359/273; 359/274; 359/900
(58) Field of Classification Search .......... 359/265–275, 359/900; 427/126.1
See application file for complete search history.

(56) References Cited

U.S. PATENT DOCUMENTS

| 6,647,166 B2 | 11/2003 | Richardson |
| 7,259,902 B2 | 8/2007 | Yoshimura |
| 7,414,772 B2 | 8/2008 | Yoshimura |

(Continued)

FOREIGN PATENT DOCUMENTS

JP    2000-204862    7/2000

(Continued)

OTHER PUBLICATIONS

Tajima et al. (2007) "Durability of All-Solid-state Switchable Mirror Based on Magnesium-Nickel Thin Film", Electrochemical Solid-state Letters, 10(3):J52-54.

(Continued)

*Primary Examiner* — Jack Dinh
(74) *Attorney, Agent, or Firm* — Suzannah K. Sundby, Esq.; Smith, Gambrell & Russell, LLP

(57) ABSTRACT

The present invention provides an all-solid-state type reflection light controllable electrochromic device having a buffer layer, and the constitution thereof comprises an all-solid-state reflective dimming electrochromic device in which a transparent conductive film layer, an ion storage layer, a solid electrolyte layer, a buffer layer, catalyst layer, and a reflective light controllable layer of a magnesium alloy thin film, in particular a multilayer thin film that uses a magnesium-nickel alloy, magnesium-titanium alloy or magnesium-niobium alloy, are formed on a transparent base that uses a glass or resin sheet, and a method for manufacturing the device, and an optical switchable component that incorporates the reflective light controllable electrochromic device, and according to the present invention, a reflective light controllable electrochromic device having a novel multilayer structure can be provided that enables high transmittance when it is transparent and enables switching in a short time over a wide area.

16 Claims, 14 Drawing Sheets

U.S. PATENT DOCUMENTS 7,545,551 B2   6/2009   Yoshimura

FOREIGN PATENT DOCUMENTS

| JP | 2003-335553 | 11/2003 |
| JP | 2005-274630 | 10/2005 |
| JP | 2006-106343 | 4/2006 |
| JP | 2006-267670 | 10/2006 |

OTHER PUBLICATIONS

International Search Report received in PCT/2008/061037 mailed Oct. 30, 2008.

ALL-SOLID-STATE REFLECTIVE DIMMING ELECTROCHROMIC DEVICE HAVING BUFFER LAYER AND DIMMER MEMBER USING THE SAME

TECHNICAL FIELD

The present invention relates to an all-solid-state reflective dimming electrochromic device, that is an all-solid-state type reflection light controllable electrochromic element or an all-solid-state reflection controllable electrochromic device that uses a magnesium alloy thin film, and particularly a magnesium-nickel, magnesium-titanium or magnesium-niobium alloy thin film, and more particularly relates to a novel all-solid-state reflective dimming electrochromic device that is able to electrically control transmission of sunlight that enters from window glass by electrically and reversibly changing a glass surface from a mirrored state to a transmitting state.

As a result of employing a specific multilayer structure that uses a magnesium alloy thin film as a reflective dimming layer, the present invention provides a novel all-solid-state reflective dimming electrochromic device is provided that has high transmittance when transparent, enables switching in a short time over a wide area, and for example, is preferably used in window glass of a building or vehicle to diminish the sense of heat within the building or vehicle by controlling transmittance of sunlight, and also provides a dimmer member incorporating this electrochromic device as well as new technologies and new products relating to this dimmer member.

BACKGROUND ART

Window glass typically serves as a medium for the transmission of large amounts of heat in a building. For example, the proportion of heat that escapes from windows during heating in winter reaches about 48%, while proportion of heat that enters from outside windows during cooling in summer reaches about 71%. Similar phenomena also apply to automobiles in which window glass also serves as a medium for the transmission of large amounts of heat. In automobiles, the proportion of window glass to space inside the vehicle is larger than that in buildings, and since there is little margin for persons in an automobile to avoid sunlight, the inside of an automobile subjected to an environment of intense sunlight reaches extremely high temperatures.

According to examples of measurements made in a summer environment in Japan, the air temperature inside a parked car reaches nearly about 70° C. With respect to the temperatures of interior components inside an automobile, that of the top of the instrument panel rises to nearly 100° C., while that of the ceiling rises to nearly 70° C. It goes without saying that a person inside such an automobile under these circumstances would be quite uncomfortable. In addition, the temperatures of interior components do not readily decrease even when opening the windows or using the air-conditioner, thereby continuously subjecting passengers to radiant heat over a long period of time and resulting in a considerable decrease in comfort within the vehicle.

Dimming glass has been developed that is capable of controlling the transmission of light and heat as a technology for solving these problems. There are several types of dimming methods used in dimming glass. Examples of dimming devices include: 1) electrochromic devices that use a material that undergoes a reversible change in transmittance by applying a current or voltage, 2) thermochromic devices that use a material that undergoes a reversible change in transmittance according to temperature, and 3) gas-chromic devices that use a material that undergoes a change in transmittance by controlling an atmospheric gas.

Among these, electrochromic devices are able to electrically control the transmission state of light and heat. Consequently, electrochromic devices are extremely suitable for use as dimming materials applied to building and automotive glass as a result of allowing the transmission state of light and heat to be set to an intended state. Moreover, since the optical characteristics of these devices do not change when a current or voltage is not applied thereto, the energy required to maintain a constant state can be reduced.

Although a portion of the constituents of electrochromic devices may be a liquid, in such cases, it is necessary to prevent leakage of the liquid. Although buildings and vehicles are premised on long-term use and it is possible to prevent leakage over a long period of time, this results in increased costs. Consequently, electrochromic devices suitable for building or vehicle glass is preferably that in which all of the materials that compose the device are in a solid state in the manner of tungsten oxide.

Tungsten oxide and other known electrochromic devices function based on the principle of dimming light by absorbing light with a dimming material. Namely, these devices inhibit heat in the form of light from entering the interior by absorbing light. However, in the case of employing a dimming material that uses this type of dimming principle, there is the problem of the dimming material retaining heat as a result of absorbing light, thereby causing that heat to again be radiated into the interior and resulting in heat penetrating into the dimming glass.

As means for solving this problem, a technique has been conceived in which dimming is carried out by reflecting light instead of by absorbing light. In other words, entry of heat into the interior caused by absorption of heat by a dimming material can be prevented by using a reflective dimming material that reversibly changes between a mirrored state and a transparent state.

An example of a reflective dimming electrochromic device having such properties disclosed in the prior art is an electrochromic device comprising the lamination of a reflective dimming layer composed of an alloy of a rare earth metal and magnesium and a hydride thereof, a proton-conducting, transparent oxidation protective layer, an anhydrous solid electrolyte layer and an ion storage layer (see Patent Document 1).

The reflective dimming layer has a function that controls reflectance of the electrochromic device, and changes reflectance by transferring protons. The oxidation protective layer is composed of a compound having proton conductivity in the manner of an oxide such as niobium oxide, vanadium oxide or tantalum oxide, or a fluoride such as magnesium fluoride or lead fluoride, and prevents oxidation of the reflective dimming layer.

The ion storage layer stores protons used to control reflectance. When a voltage is applied to dimming glass, protons migrate from the ion storage layer to the reflective dimming layer through the solid electrolyte and oxidation protective layer, and the reflectance of the reflective dimming layer changes. When an opposite voltage is applied, protons are released from the reflective dimming layer, and reflectance of the reflective dimming layer returns to its original state. In this device, however, since an expensive rare earth metal is used in the reflective dimming layer, it is difficult to apply this device to large areas from the viewpoint of cost.

An example of another reflective dimming device that uses an inexpensive and more practical material for the reflective dimming layer has been proposed in which $Mg_2Ni$ is laminated as the reflective dimming layer and palladium or platinum is laminated as a catalyst layer (see Patent Document 2). However, this material is completely unable to be used practically due to the low level of transmittance when transparent.

Although a magnesium-nickel alloy thin film developed by a portion of the inventors of the present invention (see Patent Document 3) is of the gas-chromic type that uses hydrogen gas, the visible light transmittance of this thin film is about 50%, which is a considerable improvement over the level of 20% of the previously reported $Mg_2Ni$, bringing it closer to practical use. An example of an all-solid-state dimming mirror device using this magnesium-nickel alloy thin film has been proposed in the form of an all-solid-state dimming mirror light switch comprising the lamination of an ion storage layer, a solid electrolyte layer and a reflective dimming device in the form of the magnesium-nickel alloy described in Patent Document 3 on a transparent substrate (see Patent Document 4).

However, this device has problems with durability, and although it demonstrates switching durability of 1000 cycles or more, it has the shortcoming of not returning to a reflective state due to the occurrence of deterioration. One possible cause of this was suggested to be the gradual diffusion of reflective dimming layer components and catalyst layer components into the solid electrolyte layer accompanying repeated switching (see Non-Patent Document 1).

This shortcoming was the same in devices using a magnesium-titanium alloy thin film or magnesium-niobium alloy thin film. Consequently, there has been a strong desire in this technical field for the development of an all-solid-state reflective dimming electrochromic device having high transmittance when transparent, enabling switching over a wide area, and having high durability.

Patent Document 1: Japanese Patent Application Laid-open No. 2000-204862

Patent Document 2: U.S. Pat. No. 6,647,166

Patent Document 3: Japanese Patent Application Laid-open No. 2003-335553

Patent Document 4: Japanese Patent Application Laid-open No. 2005-274630

Non-Patent Document 1: K. Tajima, Y. Yamada, O. Bao, M. Okada and K. Yoshimura, "Durability of All-Solid-State Switchable Mirror Based on Magnesium-Nickel Thin Film", Electrochemical Solid-State Letters, Vol. 10, No. 3, pp. J52-54, 2007

With the foregoing in view, as a result of conducting extensive studies for the purpose of developing an electrochromic device capable of providing a radical solution to the problems described above, the inventors of the present invention succeeded in improving durability by using an aluminum thin film as a buffer layer for the purpose of preventing diffusion of constituents between all-solid-state reflective dimming electrochromic devices using a magnesium alloy thin film, thereby leading to completion of the present invention.

DISCLOSURE OF THE INVENTION

An object of the present invention is to provide an all-solid-state reflective dimming electrochromic device, a dimming material and a dimmer member, that use a magnesium alloy thin film and the like having high transmittance when transparent as a reflective dimming layer, are composed of a laminated structure consisting of an ion storage layer, a solid electrolyte layer, a buffer layer and a catalyst layer laminated so that the reflective dimming layer becomes transparent from the side of the solid electrolyte, and which enable switching in a short time over a wide area.

The present invention is composed of the following technical means in order to solve the above-mentioned problems.

(1) An all-solid-state type reflective dimming electrochromic device comprising a reflection controllable device in which a multilayer thin film is formed on a transparent base, the multilayer film has a multilayer structure in which at least a transparent conductive film layer, an ion storage layer, a solid electrolyte layer, a buffer layer, a catalyst layer and a reflective dimming layer of a magnesium alloy thin film are formed on the transparent base.

(2) The all-solid-state type reflective dimming electrochromic device according to (1) above, wherein the transparent base is a glass or resin sheet.

(3) The all-solid-state type reflective dimming electrochromic device according to (1) above, wherein a reflective dimming action is produced by applying a voltage and/or current between the transparent conductive film layer and the reflective dimming layer.

(4) The all-solid-state type reflective dimming electrochromic device according to (1) above, wherein a transition metal oxide thin film is formed as the ion storage layer on the transparent base coated with a transparent conductive film.

(5) The all-solid-state type reflective dimming electrochromic device according to (1) above, wherein a transparent metal oxide thin film is formed as the solid electrolyte layer on the ion storage layer.

(6) The all-solid-state type reflective dimming electrochromic device according to (5) above, wherein the density of the metal oxide thin film of the solid electrolyte layer is from 2.8 $g/cm^3$ to 4.3 $g/cm^3$.

(7) The all-solid-state type reflective dimming electrochromic device according to (6) above, wherein the metal oxide of the solid electrolyte layer is tantalum oxide ($Ta_2O_5$) or zirconium oxide.

(8) The all-solid-state type reflective dimming electrochromic device according to (1) above, wherein a metal thin film is formed as a buffer layer on the solid electrolyte layer.

(9) The all-solid-state type reflective dimming electrochromic device according to (1) above, wherein the metal thin film of the buffer layer is formed of aluminum metal, tantalum metal or titanium metal.

(10) The all-solid-state type reflective dimming electrochromic device according to (1) above, wherein a layer containing palladium, platinum, silver or alloy thereof is formed as a catalyst layer on the buffer layer.

(11) The all-solid-state type reflective dimming electrochromic device according to (1) above, wherein a magnesium-nickel, magnesium-titanium or magnesium-niobium alloy thin film is formed as a reflective dimming layer on the catalyst layer.

(12) The all-solid-state type reflective dimming electrochromic device according to (11) above, wherein the alloy of the reflective dimming layer is $MgNi_x$ (wherein, $0.1 \leq x \leq 0.5$), $MgTi_x$ (wherein, $0.1 \leq x \leq 0.5$) or $MgNb_x$ (wherein, $0.3 \leq x \leq 0.6$).

(13) The all-solid-state type reflective dimming electrochromic device according to (1) above, wherein the ion storage layer or the reflective dimming layer is hydrated during manufacturing thereof.

(14) The all-solid-state type reflective dimming electrochromic device according to (1) above, wherein the transparent conductive film layer is present on the outside of the reflective dimming layer.

(15) The all-solid-state type reflective dimming electrochromic device according to (1) or (14) above, wherein the surface resistance of the transparent conductive film layer is less than 100 Ω/□.

(16) The all-solid-state type reflective dimming electrochromic device according to (1) or (14) above, wherein the transparent conductive film layer contains at least one type of metal thin film, oxide or organic compound having light transmittance of higher than 70%.

(17) A method for manufacturing an all-solid-state type reflective dimming electrochromic device in which a multilayer thin film is formed on a transparent base, the method comprising: forming a transparent conductive film layer, an ion storage layer, a solid electrolyte layer, a buffer layer and a catalyst layer on the base; and forming thereon a reflective dimming layer of a magnesium-nickel alloy, magnesium-titanium alloy or magnesium-niobium alloy thin film.

(18) An optical switchable component that incorporates the all-solid-state type reflective dimming electrochromic device according to any of (1) to (16) above therein.

The following provides a more detailed explanation of the present invention.

The present invention relates to an all-solid-state electrochromic device that demonstrates a reflective dimming action as a result of applying a voltage or current thereto. This electrochromic device is composed of a multilayer structure having a transparent conductive film, ion storage layer, solid electrolyte layer, buffer layer, catalyst layer and reflective dimming layer using a magnesium-nickel alloy thin film on a transparent base.

The present invention laminates the ion storage layer, the solid electrolyte layer, the buffer layer and the catalyst layer so that the diffusion of electrons in the reflective dimming layer is faster than the diffusion of protons injected into the reflective dimming layer, and as a result thereof, it is possible to proceed much faster than that of conventional all-solid-state reflective dimming electrochromic devices between a reflective state and a transparent state, and since the aluminum thin film used for the buffer layer has superior conductivity, it is possible to switch uniformly the entire region of the device.

The thin films that compose each of these layers can be produced by, for example, magnetron sputtering, vacuum deposition, electron beam deposition, chemical vapor deposition (CVD) or plating. However, the production method of the thin film is not limited to the production methods listed above. Deposition of each of these layers is preferably carried out using, for example, a magnetron sputtering system as described above.

Next, an explanation is provided of the specific structure of the all-solid-state reflective dimming electrochromic device of the present invention with reference to drawings. Furthermore, in the following explanation, the all-solid-state reflective dimming electrochromic device may be simply referred to as an "electrochromic device". FIG. 1 is a cross-sectional schematic diagram showing one embodiment of the electrochromic device of the present invention.

In FIG. 1, the electrochromic device is composed of a multilayer structure having a transparent base 10 (to be referred to as the "base"), a transparent conductive film 20, an ion storage layer 30, a solid electrolyte layer 40, a buffer layer 50, a catalyst layer 60, and a reflective dimming layer 70 that uses a magnesium alloy thin film (also referred to as the "reflective dimming layer"). Furthermore, FIG. 1 is simply a schematic diagram, and the thickness and size of the reflective dimming sheet of the present invention are not limited to the aspect shown in the drawing.

In FIG. 1, although the transparent conductive film 20, the ion storage layer 30, the solid electrolyte layer 40, the buffer layer 50, the catalyst layer 60 and the reflective dimming layer 70 are laminated on the base 10, other layers can also be laminated. For example, a transparent conductive film can also be suitably laminated on the reflective dimming layer 70.

FIG. 2 is a cross-sectional schematic diagram of an electrochromic device in which a transparent conductive film 80 is formed on the reflective dimming layer 70. Depending on the case, a transparent base can also be formed on the transparent conductive film 80 on the reflective dimming layer (FIG. 3).

Furthermore, in the present invention, the term "on" used in the explanations in the manner of "on the catalyst layer", for example, has a meaning that clearly indicates the direction in which layers are laminated, and does not necessarily have the meaning of being arranged in an adjacent manner. For example, in the case of "the catalyst layer formed on the solid electrolyte layer", this can refer to both the case of the solid electrolyte layer and the catalyst layer being arranged adjacent to each other, and the case of the solid electrolyte layer and the catalyst layer being arranged with another layer interposed there between.

Although FIGS. 1 to 3 show embodiments of the electrochromic device of the present invention, the technical scope of the present invention is not limited thereto. In the present invention, for example, an example of an aspect thereof is that in which two solid electrolyte layers are arranged therein. In addition, in the present invention, a structure is preferably employed in which each layer consisting of the transparent conductive film 20, the ion storage layer 30, the solid electrolyte layer 40, the buffer layer 50, the catalyst layer 60 and the reflective dimming layer 70 is located between two bases.

Since reflective dimming layers are susceptible to oxidative deterioration by water and oxygen, arranging bases on both sides thereof makes it possible to reduce penetration of water and oxygen. An embodiment in which the electrochromic device, which is located between the transparent bases 10 composed of a resin sheet, is further located between a pair of glass plates is preferable for more effectively preventing water and oxygen from penetrating inside the device.

FIG. 4 shows a cross-sectional schematic drawing of a reflective dimming sheet in which an electrochromic device is located between a pair of glass plates 110. An intermediate film 100 for laminated glass, such as that composed of polyvinyl butyral, can be interposed between the glass plate 110 and the electrochromic device as necessary.

The electrochromic device of the present invention is preferably applied to a dimmer member of a building member or automobile part, for example, based on the function thereof. In the case of a building member, window glass is a typical member in which it is applied. Examples of automobile parts include window glass, sun roofs, outer panels and interior components, and the electrochromic device of the present invention is applied particularly preferably to window glass or sun roofs. Use of the electrochromic device of the present invention makes it possible to control the transmitted amount of sunlight energy and maintain a comfortable interior environment.

Continuing, an explanation is provided of each member that composes the electrochromic device of the present invention. There are no particular limitations on the material or shape of the base provided it functions as a base of the electrochromic device. The base preferably not only functions as a foundation on which the transparent conductive film, the ion storage layer, the solid electrolyte layer, the catalyst layer and the reflective dimming layer are formed, but also as a barrier that inhibits penetration of water and oxygen.

More specifically, examples of the base include a glass or resin sheet. In the case of using a resin sheet, since deposition of each layer is carried out under reduced pressure conditions, the use of a material that generates a low amount of outgas is preferable from the viewpoint of maintaining reduced pressure. In addition, although the resin sheet is preferably colorless and transparent, a colored resin sheet can be used as necessary.

In the present invention, a resin sheet is defined as referring to a base made of a synthetic polymer resin. Preferable examples of resins used in the present invention from the viewpoint of price, transparency or heat resistance and the like include polyethylene terephthalate (PET), polyethylene naphthalate (PEN), Nylon and acrylic. In the case of using two bases, there are no particular limitations on the combination thereof.

A suitable combination of materials such as a glass or resin sheet can be used for the base, examples of which include a combination of glass and glass, glass and resin sheet and resin sheet and resin sheet. As shown in FIG. 4, in the case of further interposing the electrochromic device between glass, the base is preferably a resin sheet. The use of a base on which a transparent conductive film has been formed in advance for the transparent conductive film on the transparent base 10 makes it possible to simplify the work process.

The transparent conductive film 20 is composed of an electrically conductive material, and is used to control reflectance by applying a voltage and/or current to the electrochromic device. There are no particular limitations on the material of the transparent conductive film, and a known material can be used.

The ion storage layer 30 is able to reversibly store and extract protons required for switching between a transparent state and mirrored state by the reflective dimming layer. Moreover, although the ion storage layer 30 may be colored during proton extraction as necessary, a material having colorless and transparent properties is preferable. Transition metal oxides are preferable as suitable constituent materials. Examples of transition metal oxides include tungsten oxide, molybdenum oxide, niobium oxide and vanadium oxide.

Among these oxides, tungsten oxide is preferable since it demonstrates high stability ($10^6$ cycles or more) as a constituent material of an electrochromic device. However, the material is not limited thereto, and materials that are equivalent thereto can be used in the same manner. Although there are no particular limitations on the thickness of the ion storage layer 30, it is preferably within the range of 250 to 2000 nm.

The solid electrolyte layer 40 uses a material having the property of allowing protons to migrate easily due to the application of a voltage, and since it is a solid, can be used stably for a long period of time. A transparent metal oxide is preferable for this layer. In addition, since the presence of moisture can cause oxidative deterioration of the reflective dimming layer, the electrolyte is preferably anhydrous. In the present invention, a transparent metal oxide thin film is preferably formed on the ion storage layer.

Specific examples of constituents of the solid electrolyte layer 40 include tantalum oxide and zirconium oxide. However, the constituents are not limited thereto, but rather constituents that are equivalent thereto can be used in the same manner. The density of the metal oxide thin film of the solid electrolyte layer is preferably from 2.8 g/cm$^3$ to 4.3 g/cm$^3$.

The buffer layer 50 uses a material having the property of allowing protons to migrate easily due to the application of a voltage, and is preferably a metal to improve the switching rate and allow switching to occur uniformly throughout the entire device. In the present invention, a metal thin film is preferably formed on the solid electrolyte layer to serve as the buffer layer.

Specific examples of constituents of the buffer layer 50 include aluminum metal, tantalum metal and titanium metal. However, the constituent of this layer is not limited thereto, but rather constituents that are equivalent thereto can be used in the same manner. In addition, although there are no particular limitations on the film thickness of the buffer layer 50, it is preferably within the range of 1 to 5 nm.

The catalyst layer 60 formed by the reflective dimming layer demonstrates the function of a passageway for the supply and release of protons to and from the reflective dimming layer. The component of the catalyst layer that improves the rates of supply and release of protons to and from the catalyst layer and enhances switching between a mirrored state and transparent state is preferably palladium, platinum, silver or alloy thereof due to its high proton transmission capacity. Examples of palladium alloys that are used preferably include palladium-silver alloy and palladium-platinum alloy. Depending on the case, properties can be attempted to be improved by including other components in the palladium alloy.

In addition, although the presence of a certain degree of impurities is permitted since the catalyst layer is an alloy, a low level of impurities is preferable. Although there are no particularly limitations on the thickness of the catalyst layer 60, it is preferably within the range of 0.5 to 10 nm. The catalyst layer is unable to adequately demonstrate the function of a catalyst if it is excessively thin. Conversely, light transmittance of the catalyst layer decreases if it is excessively thick. In addition, if the catalyst layer exceeds a certain degree of thickness, there is no further improvement in its function as a catalyst even if the thickness thereof is additionally increased.

The reflective dimming layer 70 is a material that changes between a transparent state and a mirrored state due to the occlusion and release of hydrogen and protons, and demonstrates a reflective dimming function. The reflective dimming layer is composed of magnesium alloy. The reflective dimming layer is preferably composed of a magnesium-nickel alloy in which the amount of nickel is within the range of 0.1 to 0.5 based on a value of 1 for magnesium, a magnesium-titanium alloy in which the amount of titanium is within the range of 0.1 to 0.5 based on a value of 1 for magnesium, or a magnesium-niobium alloy in which the amount of niobium if within the range of 0.3 to 0.6 based on a value of 1 for magnesium.

With respect to a magnesium-nickel alloy in particular, a magnesium-nickel alloy in which the amount of nickel is within the range of 0.1 to 0.3 tends to increase transmittance when transparent by occluding hydrogen. $MgNi_{0.5}$ is preferable from the viewpoint of raw material costs. In the present invention, the magnesium-nickel alloy is preferably $MgNi_x$ (wherein, $0.1 \leq x \leq 0.5$), the magnesium-titanium alloy is preferably $MgTi_x$ (wherein, $0.1 \leq x \leq 0.5$) and the magnesium-niobium alloy is preferably $MgNb_x$ (wherein, $0.3 \leq x \leq 0.6$).

Depending on the case, properties can be attempted to be improved by including other components in the magnesium alloy. For example, in the present invention, even if a component other than magnesium and nickel is included in the magnesium-nickel alloy, as along as the properties of the magnesium-nickel alloy are retained, this alloy is included in the concept of a magnesium-nickel alloy. Even in cases in which the properties of the magnesium-nickel alloy decrease, as long as the crystal structure of a magnesium-nickel alloy is retained, this alloy can be included in the concept of a magnesium-nickel alloy.

In addition, although the presence of a certain degree of impurities is permitted since the reflective dimming layer 70 is an alloy, a low level of impurities is preferable. The thickness of the reflective dimming layer 70 is preferably about 20 to 200 nm. If the reflective dimming layer is excessively thin, reflectance of light in the mirrored state decreases, thereby preventing it from demonstrating adequate reflection properties. Conversely, if the reflective dimming layer is excessively thick, transmission of light in the transparent state decreases. Although different specifications may be required depending on the application, these can be accommodated by controlling film thickness.

The electrochromic device can be obtained by providing the proton storage layer and the electrolyte layer on the transparent base provided with a transparent conductive film, followed by forming the buffer layer, the catalyst layer and the reflective dimming layer thereon. With respect to the order in which these layers are produced, for example, the proton storage layer and the electrolyte layer can be provided on the base provided with the transparent conductive film followed by providing the buffer layer, the catalyst layer, the reflective dimming layer and the transparent conductive film thereon, or conversely, the reflective dimming layer and the catalyst layer can be provided on the base provided with the transparent conductive film followed by providing the buffer layer, the electrolyte layer, the proton storage layer, and preferably the transparent conductive film. The transparent conductive film preferably has surface resistance of 100 Ω/□ or less, and preferably contains at least one type of metal thin film, oxide or organic compound having light transmittance of 70% or more.

As shown in FIG. 4, examples of a glass or resin sheet used in the case of placing the electrochromic device between two glass or resin sheets include the materials indicated below. There are no particular limitations on the glass material, and typically used glass can be applied. Although a colorless glass is used for the glass, colored glass may be used as necessary.

Specific examples of glass that can be used include clear glass, green glass, bronze glass, gray glass, blue glass and UV-cut insulated glass, heat absorbing glass and tempered glass. These types of glass can also be used in combination depending on the case.

Although there are no particular limitations on the material of the resin sheet, it is preferably transparent and generates a small amount of outgas. In the case of producing each layer of the electrochromic device using a resin sheet, the use of a resin sheet that generates a small amount of outgas facilitates maintaining reduced pressure since deposition is frequently carried out under reduced pressure conditions.

The resin sheet is preferably composed of polyethylene terephthalate (PET), polyethylene naphthalate (PEN), Nylon or acrylic and the like in consideration of such factors as price, transparency and heat resistance. There are no particular limitations on the size and thickness of each layer that composes the electrochromic device. These can be determined by referring to known structures, and are suitably adjusted according to the application or required level of performance. For example, if the electrochromic device is to be used in an automobile windshield, the size of the transparent base is determined corresponding to the design of the vehicle. In addition, thickness is also determined in consideration of such factors as light transmittance and strength of the dimming material.

The method for manufacturing an all-solid-state reflective dimming electrochromic device in which a multilayer thin film is formed on a transparent base comprises forming a transparent conductive film layer, an ion storage layer, a solid electrolyte layer, a buffer layer and a catalyst layer on the base, and forming a reflective dimming layer of a magnesium-nickel alloy thin film, magnesium-titanium alloy thin film or magnesium-niobium alloy thin film thereon so as to inhibit proton diffusion in the solid electrolyte layer and so that the reflective dimming layer becomes transparent from the side of the solid electrolyte layer.

The dimming operation of the all-solid-state reflective dimming electrochromic device is carried out by applying a voltage and a current between the ion storage layer and the reflective dimming layer. Namely, if a positive voltage is applied to the transparent conductive film layer 20 and a negative voltage is applied to the reflective dimming layer 70 when the electrochromic device is in a mirrored state, protons stored in the ion storage layer 30 diffuse into the reflective dimming layer 70 through the solid electrolyte layer 40, the buffer layer 50 and the catalyst layer 60, thereby causing hydration and causing the reflective properties thereof to change from a mirrored state to a transparent state.

At this time, the catalyst layer 60 has a function that promotes transfer of protons between the solid electrolyte layer 40 and the reflective dimming layer 70, and an adequate switching rate is secured in the reflective dimming layer 70 by the catalyst layer 60. Conversely, when a negative voltage is applied to the ion storage layer 30 and a positive voltage is applied to the reflective dimming layer 70 when the electrochromic device is in a transparent state, hydrides within the reflective dimming layer 70 are dehydrated, causing the reflective properties thereof to return to a mirrored state from a transparent state. The released hydrogen returns to the ion storage layer 30 in the form of protons and is stored therein after passing through the catalyst layer 60, the buffer layer 50 and the solid electrolyte layer 40.

Although conventional materials using a magnesium alloy as a reflective dimming device having a short switching time for the change from a reflective state to a transparent state in close proximity to an electrode, they have the problem of switching time becoming remarkably long as distance from the electrode increases, thus making their use in windows and the like difficult. In contrast, in the present invention, as a result of inserting the buffer layer between the catalyst layer and the solid electrolyte layer, conductivity is improved throughout the device and switching can occur uniformly, thereby making it possible to provide a reflective dimming electrochromic device having a multilayer structure that demonstrates high transmittance when transparent and is capable of switching in a short time over a wide area, while also making it possible to provide a dimmer member that incorporates that device. The present invention is useful by providing a novel all-solid-state reflective dimming electrochromic device and a dimmer member that can be used practically.

The present invention demonstrates the effects indicated below.
(1) An all-solid-state reflective dimming electrochromic device can be provided that uses a magnesium alloy thin film material having superior reflective dimming properties.
(2) A multilayer structure of an all-solid-state reflective dimming electrochromic device can be provided that is able to control the amount of transmitted sunlight and maintain a comfortable interior environment.

(3) A dimmer member such as glass can be provided that incorporates the all-solid-state reflective dimming electrochromic device described above.

(4) A novel all-solid-state reflective dimming electrochromic device can be provided that is able to electrically control transmission of sunlight entering from window glass by electrically and reversibly causing the glass surface to change from a mirrored state to a transparent state.

(5) A reflective dimming electrochromic device and dimmer member can be provided that are capable of switching from a reflective state to a transparent state in a short time over a wide area, and can be used particularly preferably to dim window glass and the like.

(6) A large reflective dimming electrochromic device having a large surface area as well as superior productivity, convenience and economy can be produced and provided in large volume, at low cost and by a high-speed process by constructing a device structure on a resin sheet.

(7) The application range of dimmer mirrors can be enhanced dramatically since energy saving effects can be achieved simply by constructing a device structure on a resin sheet and affixing to an existing window glass and the like.

BEST MODE FOR CARRYING OUT THE INVENTION

Although the following provides a detailed explanation of the present invention based on examples thereof, the present invention is not limited to the following examples.

EXAMPLE 1

Figure 1:
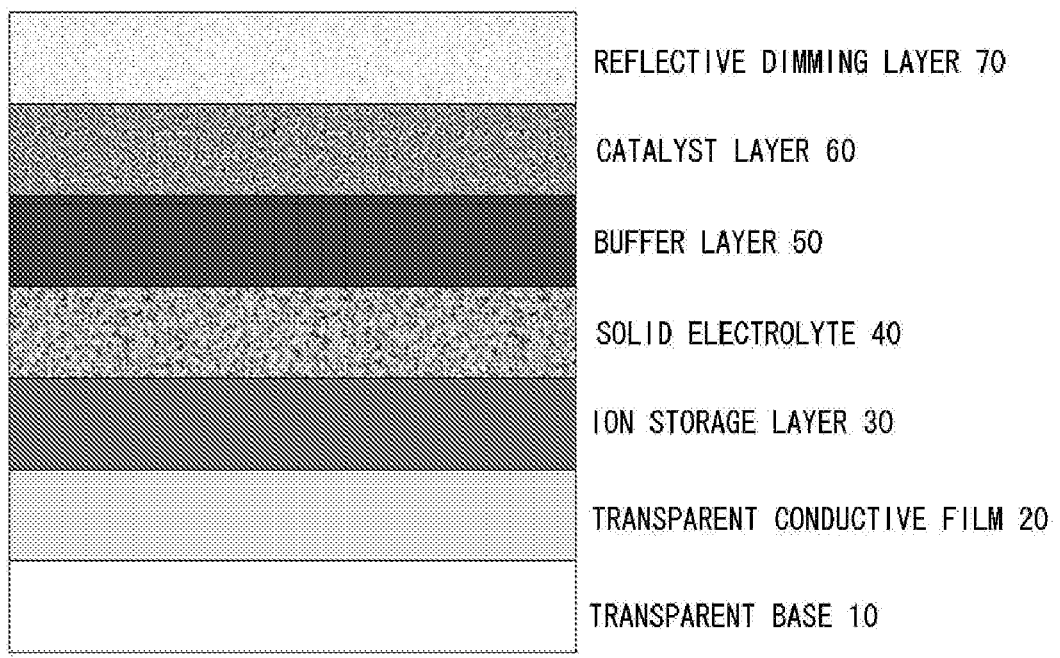
FIG. 1 shows a schematic diagram of an example of the device of the present invention (all-solid-state reflective dimming electrochromic device 1)
Figure 2:
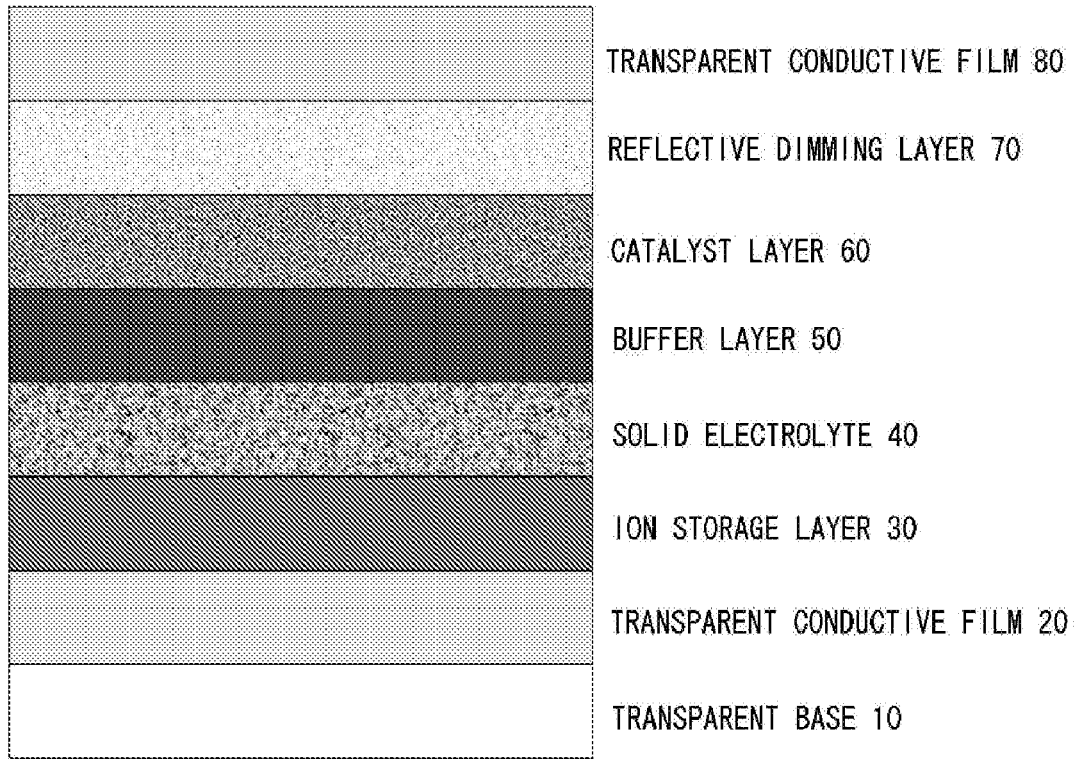
FIG. 2 shows a schematic diagram of another example of the device of the present invention (all-solid-state reflective dimming electrochromic device 2)
Figure 3:
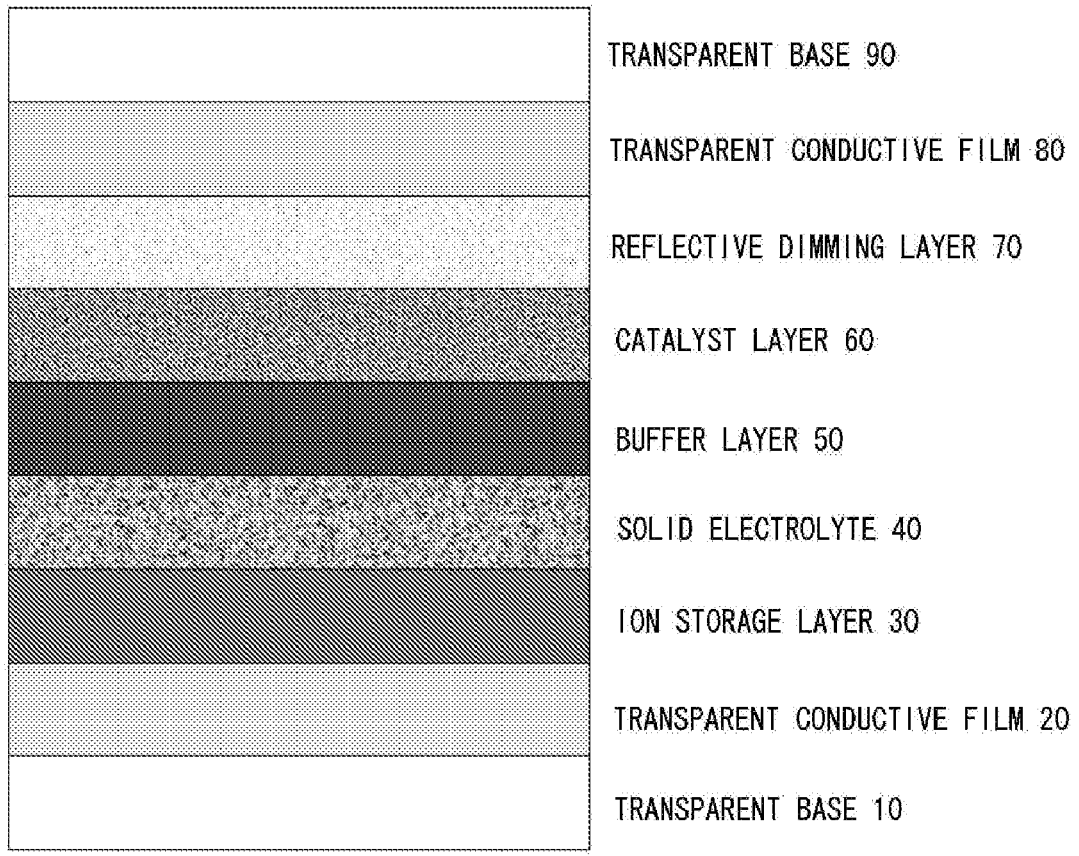
FIG. 3 shows a schematic diagram of another example of the device of the present invention (all-solid-state reflective dimming electrochromic device 3)
Figure 4:
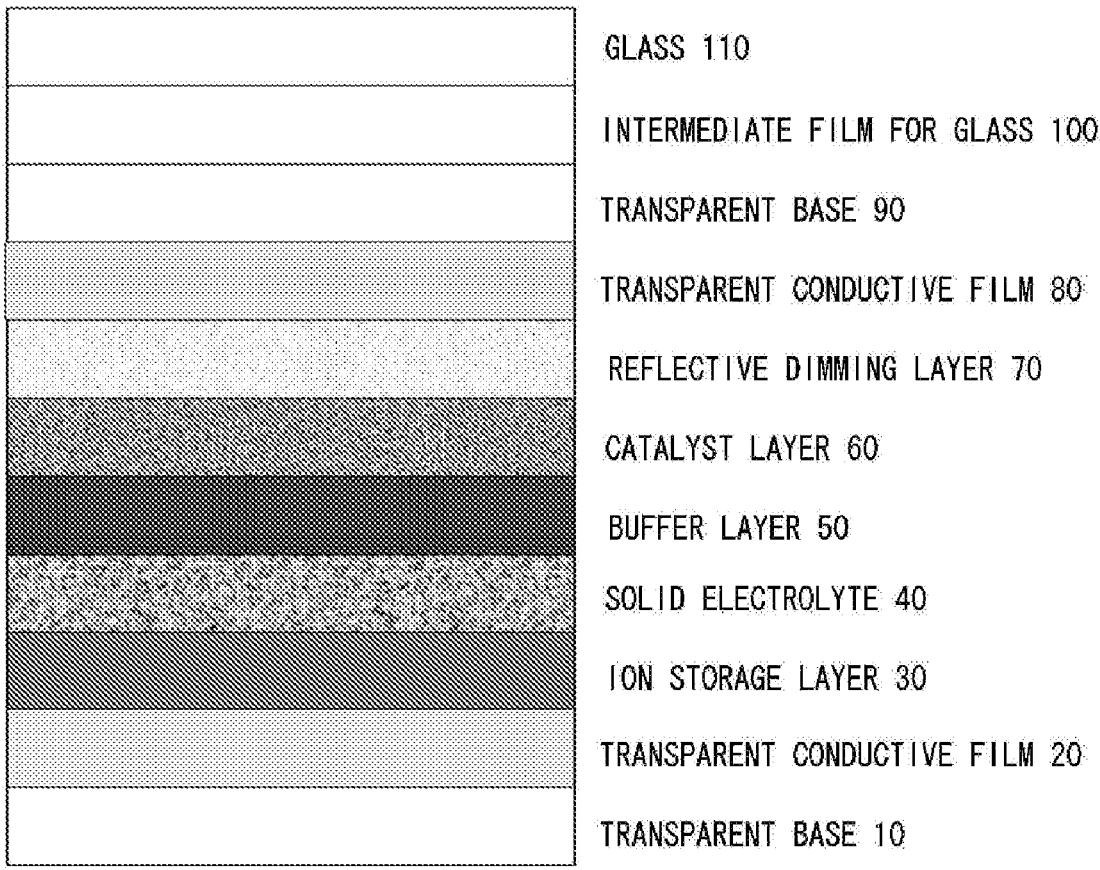
FIG. 4 shows a schematic diagram of another example of the device of the present invention (all-solid-state reflective dimming electrochromic device 4)

First, an explanation is provided of a first example of the present invention with reference to FIG. 1. An all-solid-state reflective dimming electrochromic device shown in FIG. 1 was produced in this example. Although the following provides an explanation of the order of steps of one embodiment of a manufacturing method, the technical scope of the present invention is not limited to the following process. For example, an electrochromic device can be produced by forming a transparent conductive film, a reflective dimming layer and a catalyst layer on a first base, and forming a transparent conductive film, an ion storage layer and a solid electrolyte layer on a second base, followed by lamination thereof.

A glass sheet coated with a transparent conductive film in the form of tin-doped indium oxide and having surface resistance of 10 Ω/□ and thickness of 1 mm was used as a base. After washing the base, it was placed in a vacuum device and air was evacuated to draw a vacuum. Vapor deposition of a tungsten oxide thin film on the base was carried out with a magnetron sputtering system. Deposition was carried out using reactive DC sputtering that sputters a tungsten metal target in a mixed gas atmosphere of argon and oxygen.

The mixed gas atmosphere was controlled by controlling the flow rates of the argon gas and oxygen gas. The ratio of the flow rates of the argon gas to the oxygen gas was 70:50, pressure inside the vacuum chamber was set to 0.8 Pa, and sputtering was carried out by applying power of 65 W to the tungsten by DC sputtering. The film thickness of the resulting tungsten oxide thin film was about 500 nm. The tungsten oxide thin film produced was given a dark blue color by bronzing using sulfuric acid.

A tantalum oxide thin film was produced on the tungsten oxide thin film by reactive DC sputtering in the same manner as the tungsten oxide thin film. Deposition was carried out using reactive DC sputtering that sputters a tantalum metal target in a mixed gas atmosphere of argon and oxygen to produce a thin film. The mixed gas atmosphere was controlled by controlling the flow rates of the argon gas and oxygen gas. The ratio of the flow rates of the argon gas to the oxygen gas was 70:25, pressure inside the vacuum chamber was set to 0.7

Pa, and sputtering was carried out by applying power of 65 W to the tantalum by DC sputtering. The film thickness of the resulting tantalum oxide thin film was about 400 nm and the density was about 3.8 g/cm$^3$. The color of the tungsten oxide thin film remained dark blue even after the tantalum oxide thin film was vapor-deposited thereon.

A buffer layer in the form of an aluminum thin film was vapor-deposited on the surface of the two-layer film of tantalum oxide and tungsten oxide described above by DC sputtering. Argon gas was used for the atmospheric gas, the pressure inside the vacuum chamber was set to 0.6 Pa, and sputtering was carried out by applying a power of 50 W to the aluminum metal target. The film thickness of the resulting aluminum buffer layer was about 2 nm.

Vapor deposition of a palladium catalyst layer and a magnesium-nickel alloy thin film reflective dimming layer on the surface of the three-layer film consisting of aluminum vapor-deposited for the buffer layer, tantalum oxide and tungsten oxide with a three-way magnetron sputtering system. Targets consisting of magnesium metal, nickel metal and palladium metal were respectively placed on the three sputter guns. During deposition, the palladium was sputtered first followed by vapor-depositing the catalyst layer in the form of the palladium layer to about 4 nm.

During sputtering, the argon gas pressure was 0.8 Pa, and sputtering was carried out by applying power of 14 W to the palladium by DC sputtering. Subsequently, a magnesium-nickel alloy thin film was vapor-deposited to about 40 nm by applying power of 30 W to the magnesium and applying power of 16 W to the nickel. The composition of the magnesium and nickel at this time was nearly completely $Mg_4Ni$.

Figure 5:
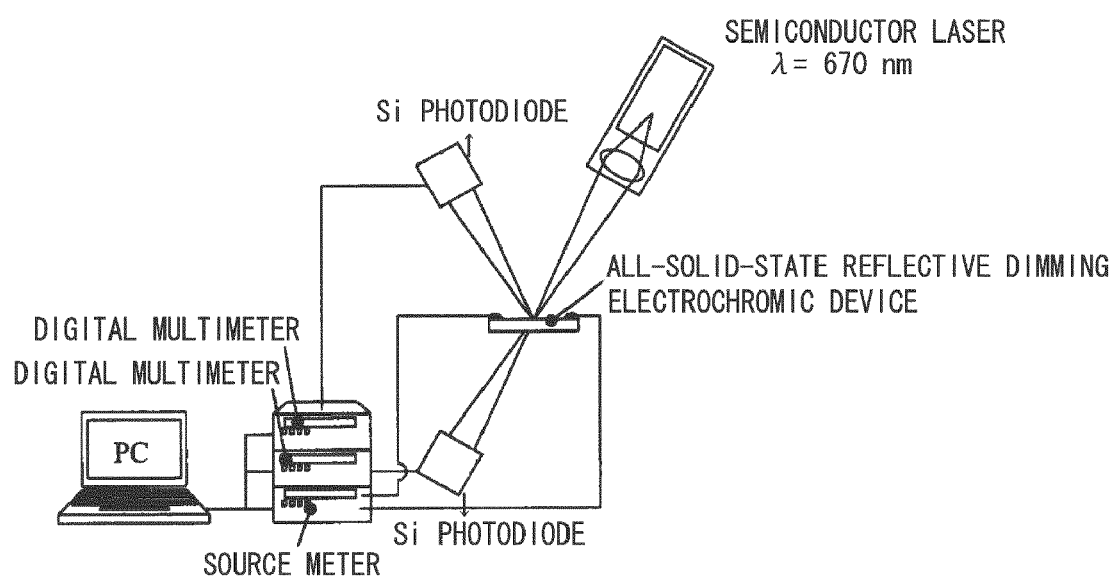
FIG. 5 shows a schematic diagram of a system for evaluating the properties of all-solid-state reflective dimming electrochromic devices.

The resulting multilayer film was attached to an evaluation system shown in FIG. 5, and the optical switching properties thereof were investigated by using indium for the electrodes of the magnesium-nickel alloy thin film and tin-doped indium oxide. This switching device was initially in a mirrored state. A voltage of ±5 V was applied between the indium electrodes and changes in light transmittance at that time were measured with a measurement system combining a semiconductor laser having a wavelength of 670 nm and a silicon photodiode.

The multilayer film immediately after production effectively reflected light (light reflectance: up to 55%) since the dimming layer in the form of a magnesium-nickel alloy thin film has metal luster, and since the ion storage layer in the form of a tungsten oxide thin film has a dark blue color, transmittance was extremely low (light transmittance: up to 0.1%). When a voltage of −5 V was applied to the indium electrode side of this multilayer film, protons contained in the tungsten oxide thin film escaped due to electric field effects, were conducted through the solid electrolyte and were introduced into the magnesium-nickel alloy thin film.

Figure 6:
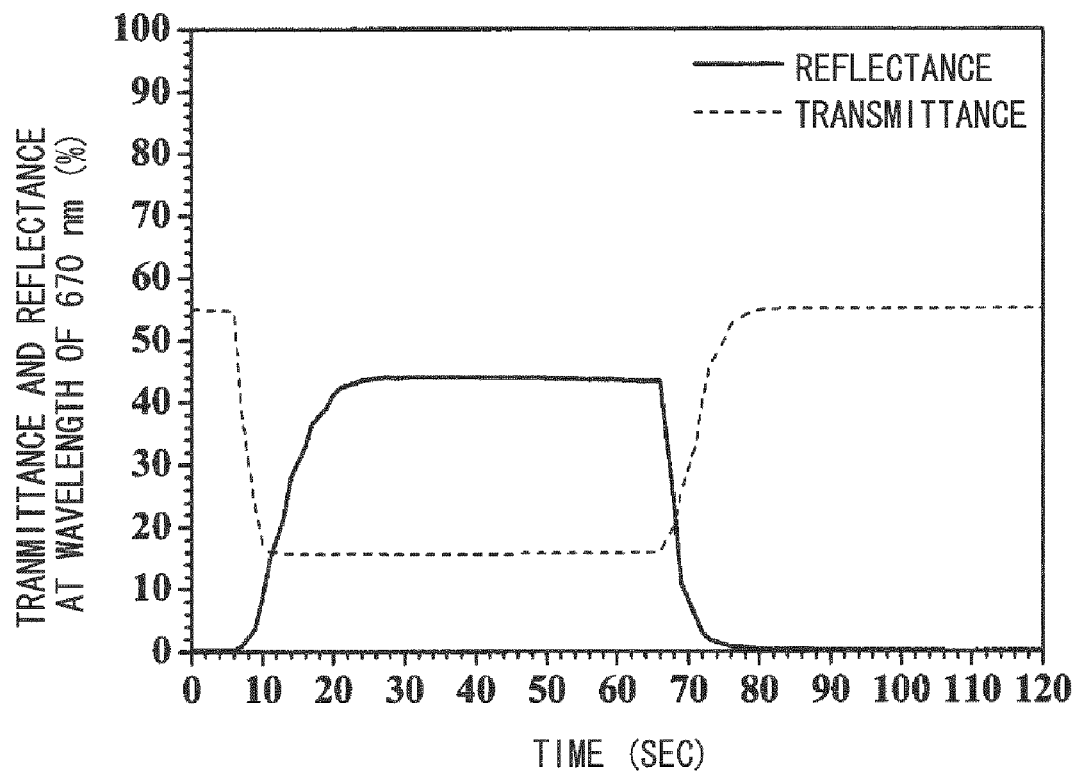
FIG. 6 shows the switching properties of an all-solid-state reflective dimming electrochromic device using a magnesium-nickel alloy thin film formed on glass (changes in light transmittance and light reflectance at a wavelength of 670 nm)

As a result, the tungsten oxide thin film became transparent, and hydration occurred in the magnesium-nickel alloy thin film causing it to also become transparent (light reflectance: up to 16%, light transmittance: up to 46%). The time-based changes in light transmittance at that time are shown in FIG. 6. In FIG. 6, this change can be seen to have taken only about 15 seconds, indicating an extremely rapid response. In addition, since the aluminum buffer layer beneath the palladium catalyst layer has superior conductivity, a uniform current is able to flow through the film, thereby serving to improve switching rate throughout the entire device. Conversely, when a +5 V voltage was applied to the indium electrode side, transmittance decreased and the device returned to a mirrored state in about 10 seconds. Consequently, this device was determined to be able to be made to reversibly change between a mirrored state and a transparent state by changing the polarity of the voltage applied thereto.

Figure 7:
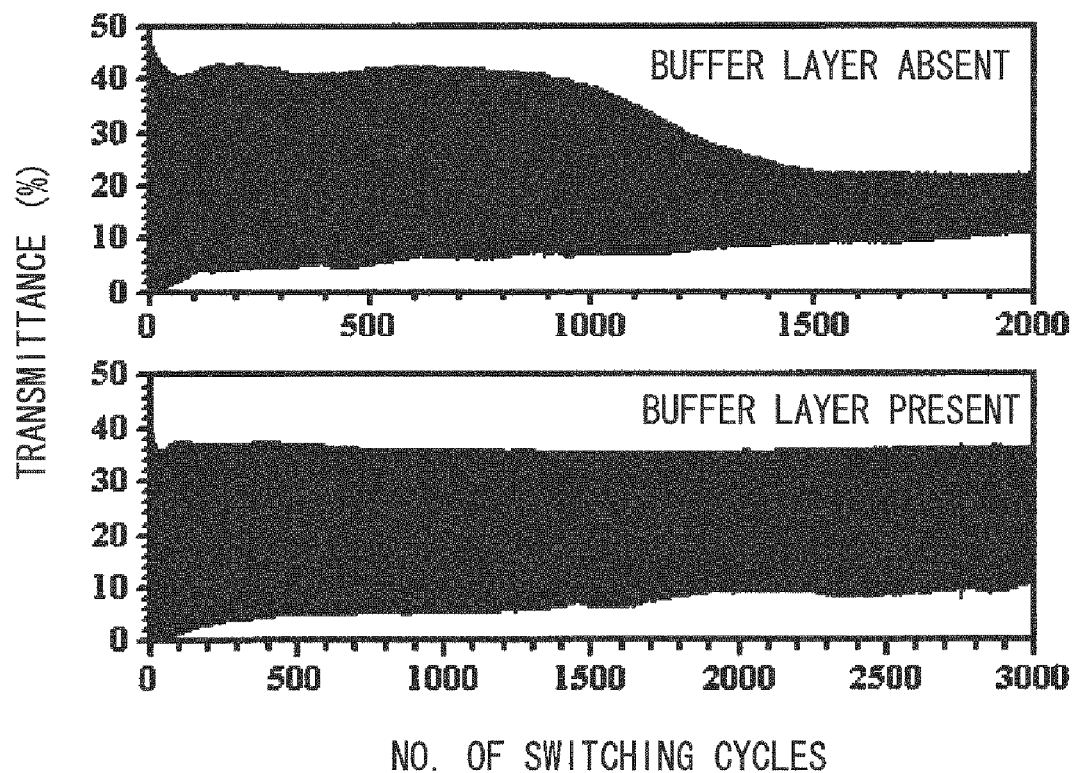
FIG. 7 shows the durability of an all-solid-state reflective dimming electrochromic device using a magnesium-nickel alloy thin film formed on glass (light transmittance at a wavelength of 670 nm, continuous switching at 120 seconds per cycle)

From the viewpoint of durability of the device in particular, although deterioration progressed and the amount of change in transmittance was only about 10% after about 1500 cycles in a device not employing an aluminum buffer layer as shown in FIG. 7, the use of an aluminum buffer layer enabled the device to withstand stable, continuous switching for 3000 cycles or more without demonstrating hardly any deterioration.

EXAMPLE 2

A two-layer film consisting of tantalum oxide and tungsten oxide was produced by following the same procedure as that of Example 1 followed by vapor-depositing a buffer layer in the form of an aluminum thin film on the surface thereof by DC sputtering. Argon was used for the atmospheric gas, and sputtering was carried out by setting the pressure in the pressure chamber to 0.6 Pa and applying power of 50 W to an aluminum metal target. The film thickness of the resulting aluminum buffer layer was about 2 nm.

Vapor deposition of a palladium catalyst layer and a magnesium-titanium alloy thin film reflective dimming layer on the surface of the three-layer film consisting of aluminum vapor-deposited for the buffer layer, tantalum oxide and tungsten oxide with a three-way magnetron sputtering system. Targets consisting of titanium metal, nickel metal and palladium metal were respectively placed on the three sputter guns. During deposition, the palladium was sputtered first followed by vapor-depositing the catalyst layer in the form of the palladium layer to about 4 nm.

During sputtering, the argon gas pressure was 0.8 Pa, and sputtering was carried out by applying power of 14 W to the palladium by DC sputtering. Subsequently, a magnesium-titanium alloy thin film was vapor-deposited to about 40 nm by applying power of 30 W to the magnesium and applying power of 30 W to the nickel. The composition of the magnesium and titanium at this time was nearly completely $Mg_8Ti$.

The resulting multilayer film was attached to the evaluation system shown in FIG. 5 in the same manner as Example 1, and the optical switching properties thereof were investigated by using indium for the electrodes of the magnesium-titanium alloy thin film and tin-doped indium oxide. This switching device was initially in a mirrored state. A voltage of ±5 V was applied between the indium electrodes and changes in light transmittance at that time were measured with a measurement system combining a semiconductor laser having a wavelength of 670 nm and a silicon photodiode.

The multilayer film immediately after production effectively reflected light (light reflectance: up to 56%) since the dimming layer in the form of a magnesium-titanium alloy thin film has metal luster, and since the ion storage layer in the form of a tungsten oxide thin film has a dark blue color, transmittance was extremely low (light transmittance: up to 0.1%). When a voltage of −5 V was applied to the indium electrode side of this multilayer film, protons contained in the tungsten oxide thin film escaped due to electric field effects, were conducted through the solid electrolyte and were introduced into the magnesium-titanium alloy thin film.

Figure 8:
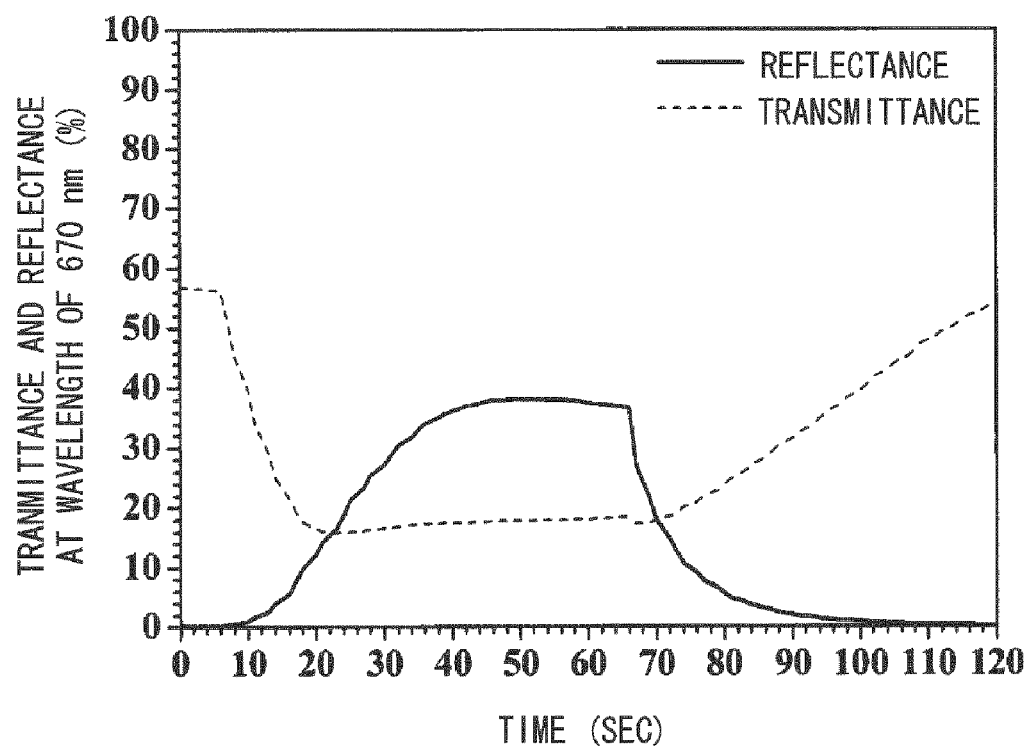
FIG. 8 shows the switching properties of an all-solid-state reflective dimming electrochromic device using a magnesium-titanium alloy thin film formed on glass (changes in light transmittance and light reflectance at a wavelength of 670 nm)

As a result, the tungsten oxide thin film became transparent, and hydration occurred in the magnesium-titanium alloy thin film causing it to also become transparent (light reflectance: up to 18%, light transmittance: up to 40%). The time-based changes in light transmittance at that time are shown in FIG. 8. In FIG. 8, this change can be seen to have taken only about 15 seconds, indicating an extremely rapid response. In addition, since the aluminum buffer layer beneath the palladium catalyst layer has superior conductivity, a uniform current is able to flow through the film, thereby serving to improve switching rate throughout the entire device. Conversely, when a +5 V voltage was applied to the indium electrode side, transmittance decreased and the device returned to a mirrored state in about 10 seconds. Consequently, this device was determined to be able to be made to reversibly change between a mirrored state and a transparent state by changing the polarity of the voltage applied thereto.

Figure 9:
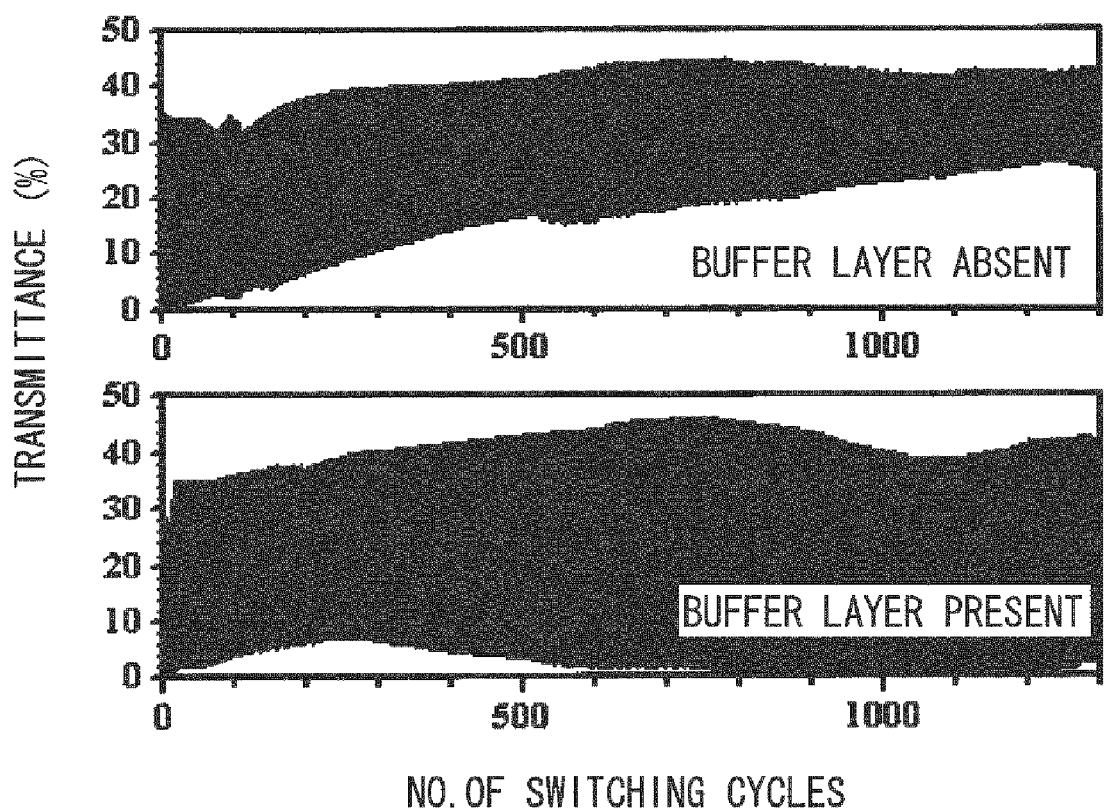
FIG. 9 shows the durability of an all-solid-state reflective dimming electrochromic device using a magnesium-titanium alloy thin film formed on glass (light transmittance at a wavelength of 670 nm, continuous switching at 120 seconds per cycle)

From the viewpoint of durability of the device in particular, in a device not employing an aluminum buffer layer as shown in FIG. 9, although deterioration progressed rapidly and the device did not return to its base state (reflective state), the use of an aluminum buffer layer enabled the device to withstand stable, continuous switching for 1000 cycles or more without demonstrating hardly any deterioration.

EXAMPLE 3

A two-layer film consisting of tantalum oxide and tungsten oxide was produced by following the same procedure as that of Example 1 followed by vapor-depositing a buffer layer in the form of an aluminum thin film on the surface thereof by DC sputtering. Argon was used for the atmospheric gas, and sputtering was carried out by setting the pressure in the pressure chamber to 0.6 Pa and applying power of 50 W to an aluminum metal target. The film thickness of the resulting aluminum buffer layer was about 2 nm.

Vapor deposition of a palladium catalyst layer and a magnesium-niobium alloy thin film reflective dimming layer on the surface of the three-layer film consisting of aluminum vapor-deposited for the buffer layer, tantalum oxide and tungsten oxide with a three-way magnetron sputtering system. Targets consisting of niobium metal, nickel metal and palladium metal were respectively placed on the three sputter guns. During deposition, the palladium was sputtered first followed by vapor-depositing the catalyst layer in the form of the palladium layer to about 4 nm.

During sputtering, the argon gas pressure was 0.6 Pa, and sputtering was carried out by applying power of 45 W to the palladium by DC sputtering. Subsequently, a magnesium-titanium alloy thin film was vapor-deposited to about 40 nm by applying power of 30 W to the magnesium and applying power of 40 W to the niobium. The composition of the magnesium and niobium at this time was nearly completely $MgNb_{0.59}$.

The resulting multilayer film was attached to the evaluation system shown in FIG. 5 in the same manner as Example 1, and the optical switching properties thereof were investigated by using indium for the electrodes of the magnesium-niobium alloy thin film and tin-doped indium oxide. This switching device was initially in a mirrored state. A voltage of ±5 V was applied between the indium electrodes and changes in light transmittance at that time were measured with a measurement system combining a semiconductor laser having a wavelength of 670 nm and a silicon photodiode.

The multilayer film immediately after production effectively reflected light since the dimming layer in the form of a magnesium-niobium alloy thin film has metal luster, and since the ion storage layer in the form of a tungsten oxide thin film has a dark blue color, transmittance was extremely low (light transmittance: up to 0.1%). When a voltage of −5 V was applied to the indium electrode side of this multilayer film, protons contained in the tungsten oxide thin film escaped due to electric field effects, were conducted through the solid electrolyte and were introduced into the magnesium-niobium alloy thin film.

Figure 10:
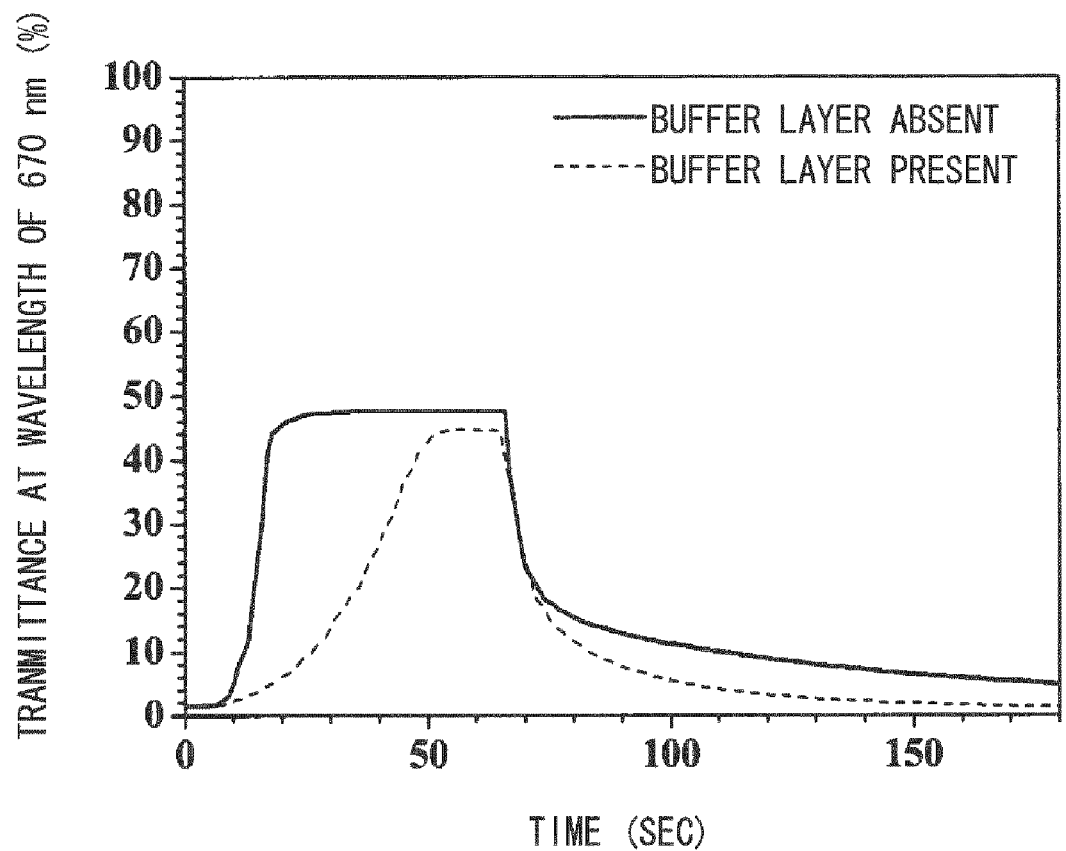
FIG. 10 shows the switching properties of an all-solid-state reflective dimming electrochromic device using a magnesium-niobium alloy thin film formed on glass (change in light transmittance at a wavelength of 670 nm)

As a result, the tungsten oxide thin film became transparent, and hydration occurred in the magnesium-niobium alloy thin film causing it to also become transparent. Time-based changes in light transmittance of devices in which an aluminum buffer layer was absent and present are shown in FIG. 10. In the case of using an aluminum buffer layer, although a decrease in switching rate from the mirrored state to the transparent state was observed, the entire device was determined to demonstrate a uniform transparent state in about 1 minute, which was considered to be adequate for withstanding practical use.

Figure 11:
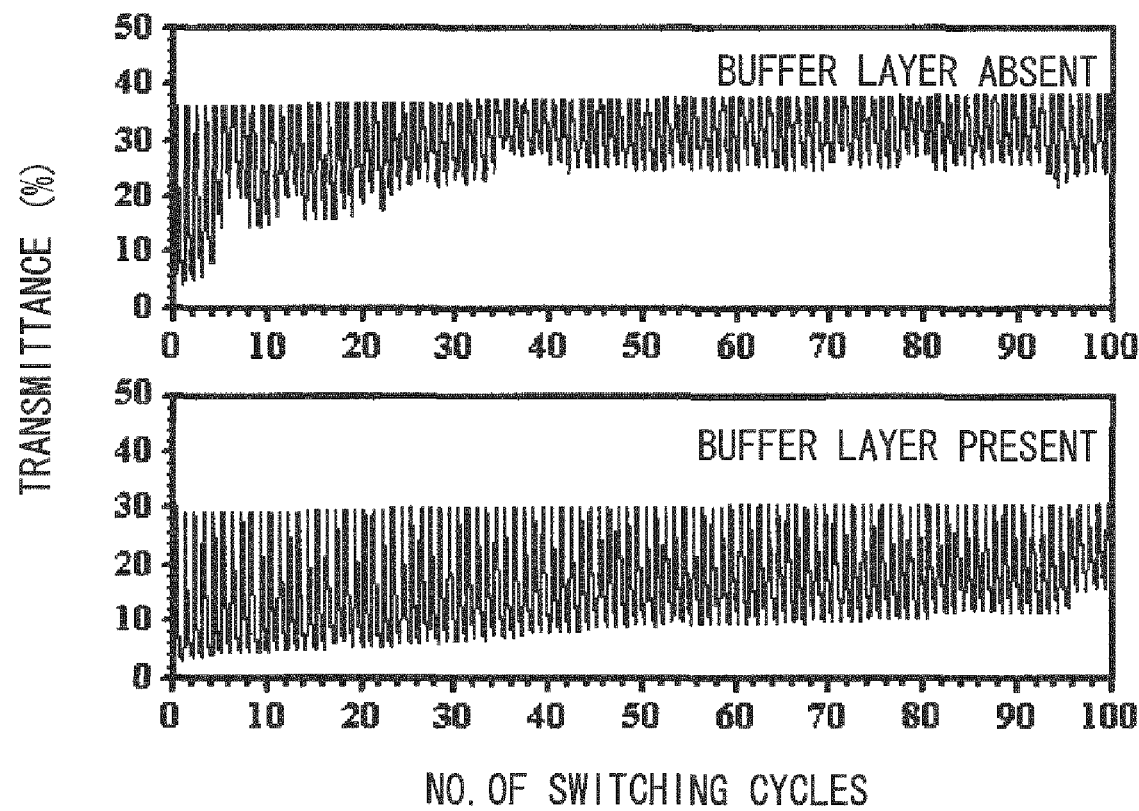
FIG. 11 shows the durability of an all-solid-state reflective dimming electrochromic device using a magnesium-niobium alloy thin film formed on glass (light transmittance at a wavelength of 670 nm, continuous switching at 120 seconds per cycle)

The time required to return to the mirrored state when a voltage of the opposite polarity was applied was improved. As a result, this device was determined to be able to be made to reversibly change between a mirrored state and a transparent. In addition, although the durability of a device using a magnesium-niobium alloy thin film for the dimming layer is low, the use of an aluminum buffer layer was determined to improve that durability (FIG. 11).

EXAMPLE 4

The following provides an explanation of a fourth example of the present invention. In this example, a resin sheet exemplified by PET or PEN was used for the base, a transparent conductive film, an ion storage layer, a solid electrolyte layer and a buffer layer were formed on the base, and a catalyst layer and a reflective dimming layer were then formed thereon.

A PET sheet coated with a transparent conductive film in the form of tin-doped indium oxide (ITO) and having surface resistance of 35 Ω/□ and thickness of 0.125 mm was used as a base. After washing the base, it was placed in a vacuum device and air was evacuated to draw a vacuum. Vapor deposition of a tungsten oxide thin film on the base was carried out with a magnetron sputtering system. Deposition was carried out using reactive DC sputtering that sputters a tungsten metal target in a mixed gas atmosphere of argon, oxygen and hydrogen.

The mixed gas atmosphere was controlled by controlling the flow rates of the argon gas, oxygen gas and hydrogen gas. The ratio of the flow rates of the argon gas to the oxygen gas to the hydrogen gas was 4:1:3, pressure inside the vacuum chamber was set to 1.0 Pa, and sputtering was carried out by applying power of 65 W to the tungsten by DC sputtering. The film thickness of the resulting tungsten oxide thin film was about 500 nm.

A tantalum oxide thin film was produced on the tungsten oxide thin film by reactive DC sputtering in the same manner as the tungsten oxide thin film. Deposition was carried out by sputtering a tantalum metal target in a mixed gas atmosphere of argon and oxygen to produce a thin film to produce a thin film. The mixed gas atmosphere was controlled by controlling the flow rates of the argon gas and oxygen gas.

The ratio of the flow rates of the argon gas to the oxygen gas was 70:25, pressure inside the vacuum chamber was set to 0.7 Pa, and sputtering was carried out by applying power of 65 W to the tantalum by DC sputtering. The film thickness of the resulting tantalum oxide thin film was about 400 nm and the density was about 3.8 g/cm$^3$. The color of the tungsten oxide thin film remained dark blue even after the tantalum oxide thin film was vapor-deposited thereon.

A buffer layer in the form of an aluminum thin film was vapor-deposited on the surface of the two-layer film of tantalum oxide and tungsten oxide described above by DC sputtering. Argon gas was used for the atmospheric gas, the pressure inside the vacuum chamber was set to 0.6 Pa, and sputtering was carried out by applying a power of 50 W to the aluminum metal target. The film thickness of the resulting aluminum buffer layer was about 2 nm.

Vapor deposition of a palladium catalyst layer and a magnesium-nickel alloy thin film reflective dimming layer on the surface of the three-layer film consisting of aluminum vapor-deposited for the buffer layer, tantalum oxide and tungsten oxide with a three-way magnetron sputtering system. Targets consisting of magnesium metal, nickel metal and palladium metal were respectively placed on the three sputter guns. During deposition, the palladium was sputtered first followed by vapor-depositing the catalyst layer in the form of the palladium layer to about 4 nm.

During sputtering, the argon gas pressure was 0.8 Pa, and sputtering was carried out by applying power of 14 W to the palladium by DC sputtering. Subsequently, a magnesium-nickel alloy thin film was vapor-deposited to about 40 nm by applying power of 30 W to the magnesium and applying power of 16 W to the nickel. The composition of the magnesium and nickel at this time was nearly completely $Mg_4Ni$.

The resulting multilayer film was attached to an evaluation system shown in FIG. 5, and the optical switching properties thereof were investigated by using indium for the electrodes of the magnesium-nickel alloy thin film and tin-doped indium oxide. This device was initially in a mirrored state. A voltage of ±5 V was applied between the indium electrodes and changes in light transmittance at that time were measured with a measurement system combining a semiconductor laser having a wavelength of 670 nm and a silicon photodiode.

The multilayer film immediately after production effectively reflected light (light reflectance: up to 56%) since the dimming layer in the form of a magnesium-nickel alloy thin film has metal luster, and since the ion storage layer in the form of a tungsten oxide thin film has a dark blue color, transmittance was extremely low (light transmittance: up to 0.1%). When a voltage of −5 V was applied to the indium electrode side of this multilayer film, protons contained in the tungsten oxide thin film escaped due to electric field effects, were conducted through the solid electrolyte and were introduced into the magnesium-nickel alloy thin film.

Figure 12:
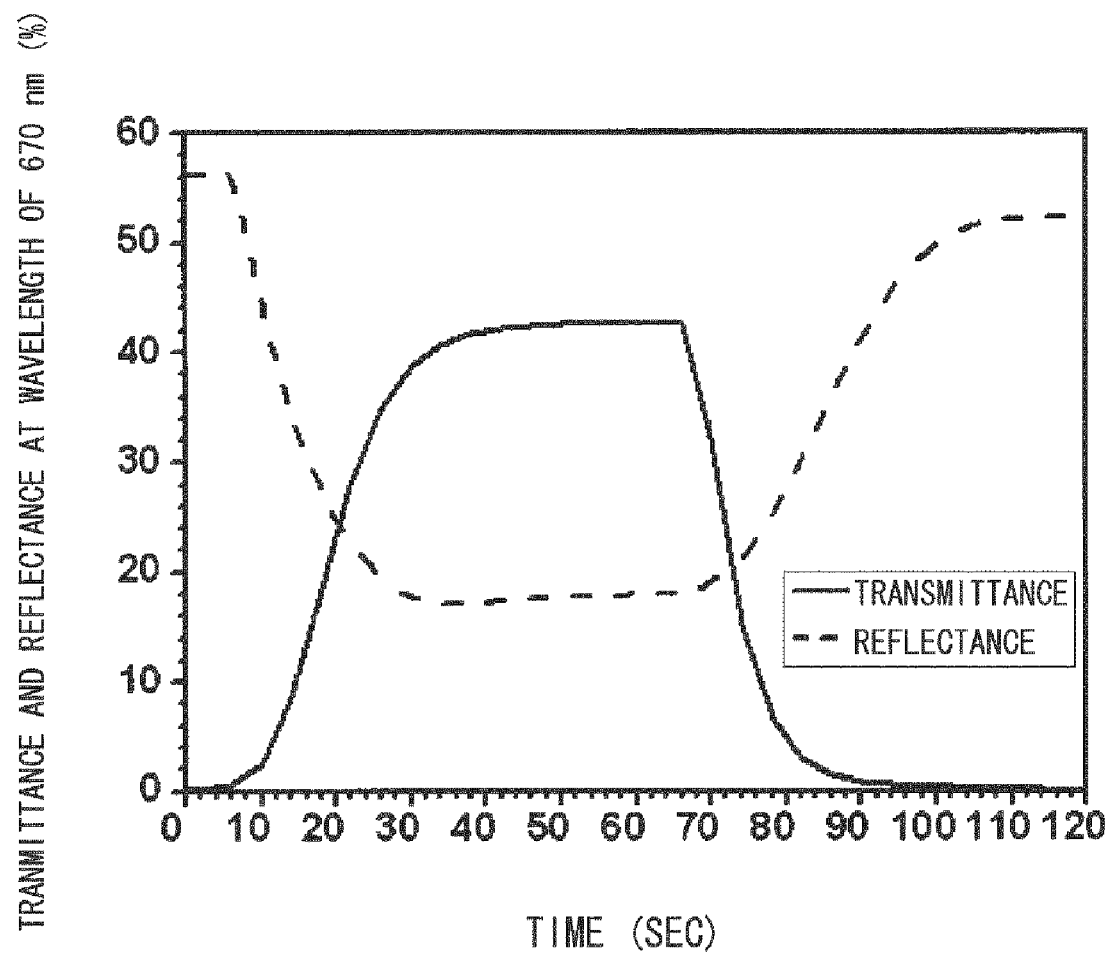
FIG. 12 shows the switching properties of an all-solid-state reflective dimming electrochromic device using a magnesium-nickel alloy thin film formed on a PET sheet (changes in light transmittance and light reflectance at a wavelength of 670 nm)

As a result, the tungsten oxide thin film became transparent, and hydration occurred in the magnesium-nickel alloy thin film causing it to also become transparent (light reflectance: up to 18%, light transmittance: up to 43%). The time-based changes in light transmittance and reflectance at that time are shown in FIG. 12. In FIG. 12, this change can be seen to have taken only about 20 seconds, indicating an extremely rapid response. Conversely, when a +5 V voltage was applied to the indium electrode side, transmittance decreased and the device returned to a mirrored state in about 20 seconds. Consequently, this device was determined to be able to be made to reversibly change between a mirrored state and a transparent state by changing the polarity of the voltage applied thereto.

Figure 13:
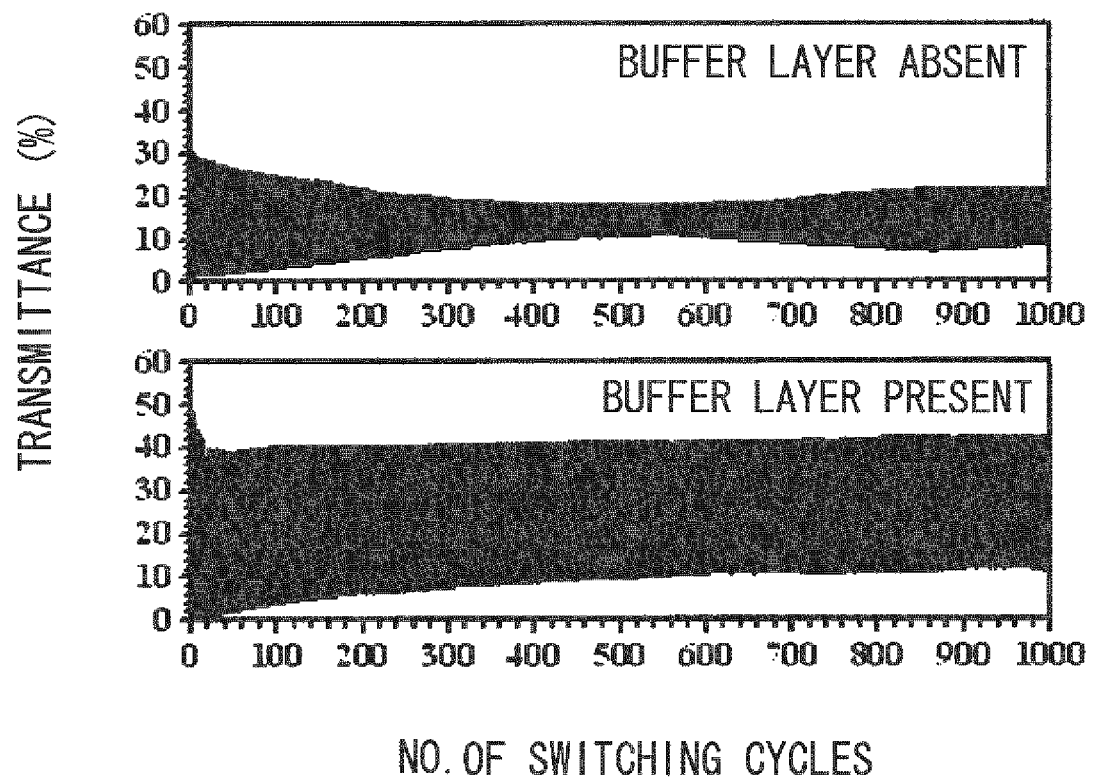
FIG. 13 shows the durability of an all-solid-state reflective dimming electrochromic device using a magnesium-nickel alloy thin film formed on a PET sheet (light transmittance at a wavelength of 670 nm, continuous switching at 120 seconds per cycle); and, FIG. 14 shows the transmission spectrum of an all-solid-state reflective dimming electrochromic device using a magnesium-nickel alloy thin film formed on a PET sheet.

From the viewpoint of durability of the device in particular, although there was little change in transmittance due to poor conductivity of a device in which an aluminum buffer layer was not provided as shown in FIG. 13, the use of an aluminum buffer layer resulted in high transmittance during light transmission and enabled the device to withstand stable, continuous switching for 1000 cycles or more.

Figure 14:
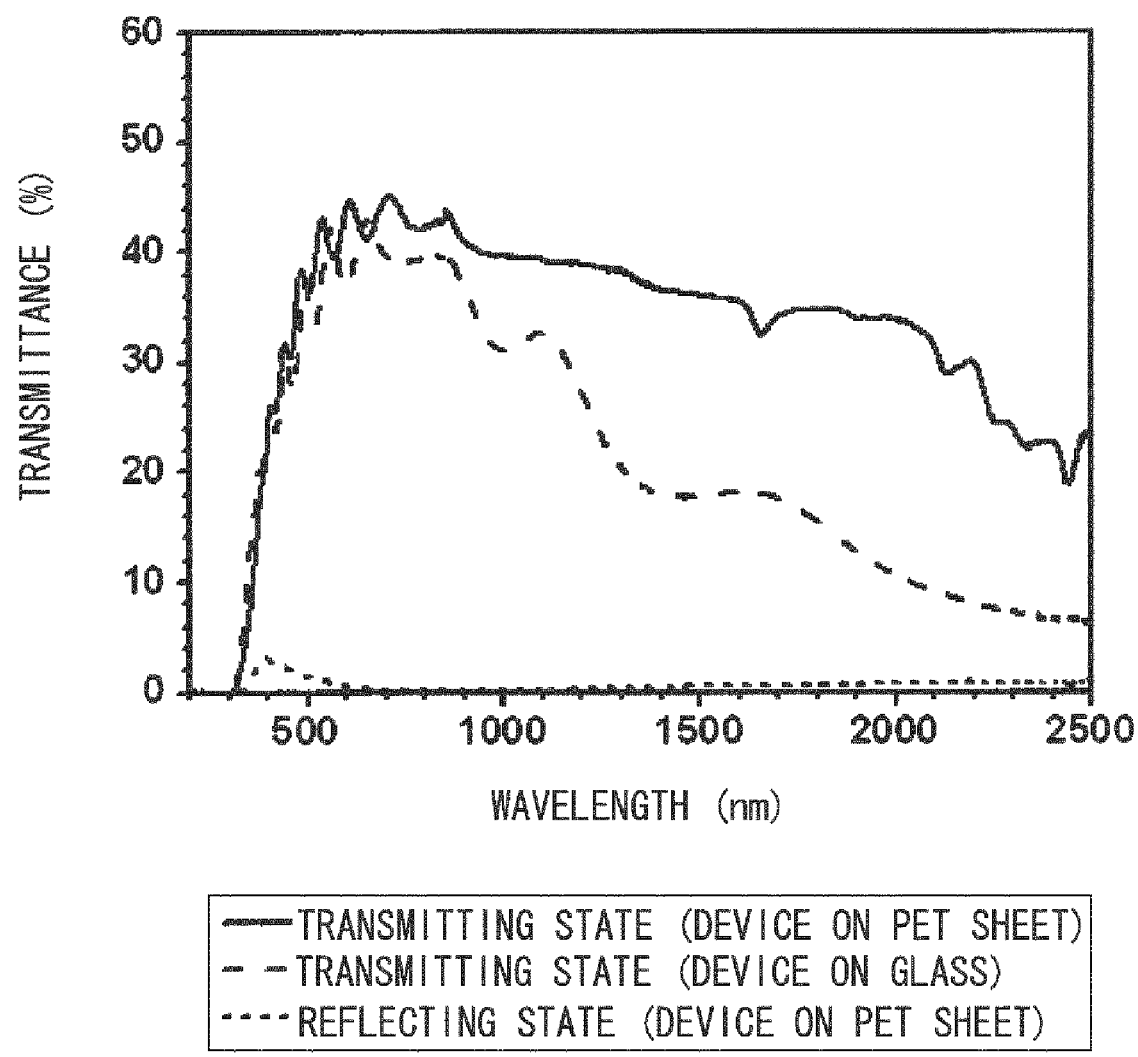

The transmission spectrum of a device that shows the transmission state after switching is shown in FIG. 14. As shown in this graph, a device formed on a PET sheet can be seen to demonstrate a switching range roughly twice that of a device formed on glass in a wavelength region in the vicinity of the infrared region. A wide switching range in a wavelength region in the vicinity of the infrared region means that switching of such a device results in superior ability to control the entrance of heat from sunlight into an interior.

On the basis of the results described above, the construction of a device structure on a PET sheet can be expected to improve productivity in terms of processability, economy, market availability, recyclability, convenience and the like, and due to the wide switching range in a wavelength region in the vicinity of the infrared region, it was determined to be able to impart more suitably properties as a dimming window material.

INDUSTRIAL APPLICABILITY

As has been described above, the present invention relates to an all-solid-state reflective dimming electrochromic device that uses a magnesium-nickel alloy thin film material having superior reflective dimming properties, and according to the present invention, an all-solid-state reflective dimming electrochromic device and a dimmer member incorporating that device can be produced and provided that are able to control the transmitted amount of sunlight energy in accordance with the intentions of a person to maintain a comfortable interior space. The present invention is useful by providing an all-solid-state reflective dimming electrochromic device that uses a magnesium alloy thin film material having superior reflective dimming properties.

The invention claimed is:

1. An all-solid-state type reflective dimming electrochromic device comprising a reflection controllable device in which a multilayer thin film is formed on a transparent base, the multilayer film has a multilayer structure in which at least a transparent conductive film layer, an ion storage layer, a solid electrolyte layer, a buffer layer, a catalyst layer and a reflective dimming layer of a magnesium alloy thin film are formed on the transparent base, wherein the buffer layer has a metal thin film formed on the solid electrolyte layer, and the metal thin film of the buffer layer is formed of aluminum metal, tantalum metal, or titanium metal.

2. The all-solid-state type reflective dimming electrochromic device according to claim 1, wherein the transparent base is a glass or resin sheet.

3. The all-solid-state type reflective dimming electrochromic device according to claim 1, wherein a reflective dimming action is produced by applying a voltage and/or current between the transparent conductive film layer and the reflective dimming layer.

4. The all-solid-state type reflective dimming electrochromic device according to claim 1, wherein a transition metal oxide thin film is formed as the ion storage layer on the transparent base coated with a transparent conductive film.

5. The all-solid-state type reflective dimming electrochromic device according to claim 1, wherein a transparent metal oxide thin film is formed as the solid electrolyte layer on the ion storage layer.

6. The all-solid-state type reflective dimming electrochromic device according to claim 5, wherein the density of the metal oxide thin film of the solid electrolyte layer is from 2.8 g/cm$^3$ to 4.3 g/cm$^3$.

7. The all-solid-state type reflective dimming electrochromic device according to claim 6, wherein the metal oxide of the solid electrolyte layer is tantalum oxide ($Ta_2O_5$) or zirconium oxide.

8. The all-solid-state type reflective dimming electrochromic device according to claim 1, wherein a layer containing palladium, platinum, silver or alloy thereof is formed as a catalyst layer on the buffer layer.

9. The all-solid-state type reflective dimming electrochromic device according to claim 1, wherein a magnesium-nickel, magnesium-titanium or magnesium-niobium alloy thin film is formed as a reflective dimming layer on the catalyst layer.

10. The all-solid-state type reflective dimming electrochromic device according to claim 9, wherein the alloy of the reflective dimming layer is $MgNi_x$ (wherein, $0.1 \leq x \leq 0.5$), $MgTi_x$ (wherein, $0.1 \leq x \leq 0.5$) or $MgNb_x$ (wherein, $0.3 \leq x \leq 0.6$).

11. The all-solid-state type reflective dimming electrochromic device according to claim 1, wherein the ion storage layer or the reflective dimming layer is hydrated during manufacturing thereof.

12. The all-solid-state type reflective dimming electrochromic device according to claim 1, wherein the transparent conductive film layer is present on the outside of the reflective dimming layer.

13. The all-solid-state type reflective dimming electrochromic device according to claim 1, wherein the surface resistance of the transparent conductive film layer is less than 100 $\Omega/\square$.

14. The all-solid-state type reflective dimming electrochromic device according to claim 1, wherein the transparent conductive film layer contains at least one type of metal thin film, oxide or organic compound having light transmittance of higher than 70%.

15. An optical switchable component that incorporates the all-solid-state type reflective dimming electrochromic device according to claim 1 therein.

16. A method for manufacturing an all-solid-state type reflective dimming electrochromic device in which a multilayer thin film is formed on a transparent base, the method comprising: forming a transparent conductive film layer, an ion storage layer, a solid electrolyte layer, a buffer layer and a catalyst layer on the base; and forming thereon a reflective dimming layer of a magnesium-nickel alloy, magnesium-titanium alloy or magnesium-niobium alloy thin film, wherein the buffer layer has a metal thin film formed on the solid electrolyte layer, and the metal thin film of the buffer layer is formed of aluminum metal, tantalum metal, or titanium metal.

* * * * *